Jan. 1, 1963 H. H. SCOTT 3,071,648
STEREO AMPLIFIER APPARATUS AND THE LIKE
Filed July 16, 1959
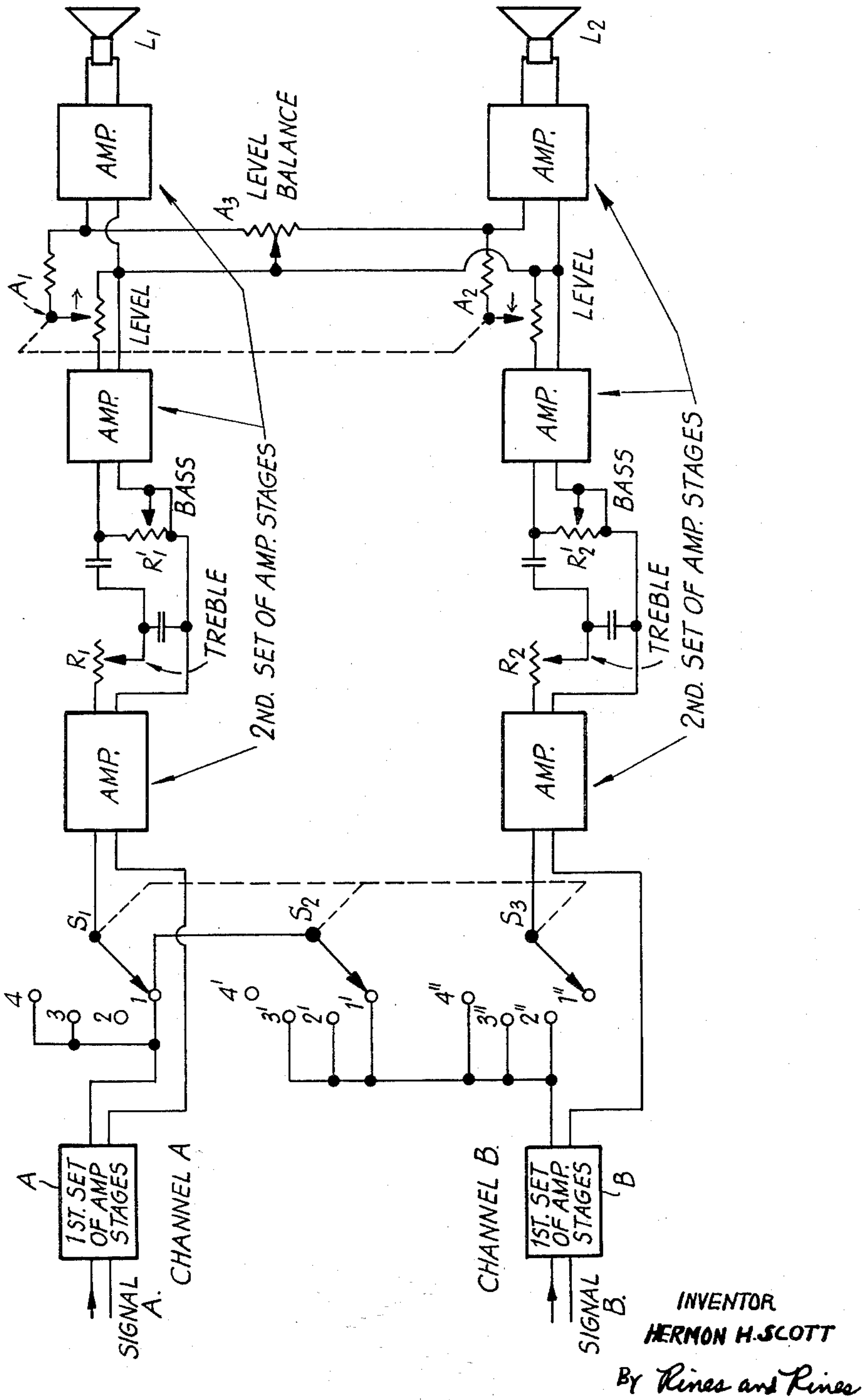
INVENTOR
HERMON H. SCOTT
BY Rines and Rines
ATTORNIES 3,071,648
Patented Jan. 1, 1963

3,071,648

STEREO AMPLIFIER APPARATUS AND THE LIKE

Hermon H. Scott, Grasshopper Lane, Lincoln, Mass.

Filed July 16, 1959, Ser. No. 827,574
4 Claims. (Cl. 179—1)

The present invention relates to multiple-signal transmission apparatus and, more particularly, to stereophonic amplifying apparatus. The invention, however, is of more general application, also, as will be evident from the description hereinafter presented; but it is of particular advantage in connection with the setreophonic reproduction of audio signals, whether in conjunction with playing disk records, films or tapes, or radio reception, telephony, or other related applications.

It has heretofore been proposed to attempt to balance the audio signals transmitted through such stereophonic apparatus by transmitting a signal from a test oscillator through each channel, and adjusting the gain of the channels to produce substantially equal outputs therefrom. Such a technique, however, in addition to requiring special test oscillator equipment or the like, does not actually balance the channels for all of the frequencies involved in the actual sound signals, such as music or the like, customarily applied to such systems. Over-all balance is important, however, in order to adjust for the unmatched responses of the various components constituting each channel, particularly the loudspeakers, in order that the listener may achieve substantially equal transmission of sounds in each channel at all of the sound frequencies being transmitted, thereby to attain the most effective stereophonic effect.

An object of the present invention, accordingly, is to provide a new and improved stereophonic apparatus that shall not be subject to the above-mentioned limitations, but that, to the contrary, through a novel switching, signal-combining and level-and-frequency adjustment, shall provide for the ready balancing of all sound frequencies in the channels in a direct and simple manner, and without the necessity for the prior-art special test oscillator equipment or the like.

A further object is to provide a novel amplifying apparatus of more general utility, applicable to other kinds of multiple-signal transmission, wherein the advantages of the present invention are also desired.

Other and further objects will be explained hereinafter and will be more particularly pointed out in the appended claims.

The invention will now be described in connection with the accompanying drawing the single FIGURE of which is a schematic circuit diagram showing the invention in preferred form as applied to the illustrative example of a stereophonic reproducing apparatus.

Stereophonic audio signals are shown applied from any desired disk, film, tape or other source, above-described and not illustrated, to the first amplifier stages A and B of a corresponding pair of stereophonic channels. The channels each are provided, in addition to the first amplifier stages A and B, with second or further sets of amplifier stages, so-labelled, that ultimately drive respective loudspeakers $L_1$ and $L_2$. The second sets of amplifier stages are shown, for illustrative purposes, as comprising three amplifiers, such as electron-tube, transistor or other similar conventional apparatus, schematically shown in block form.

Switching mechanisms are interposed between the first and second sets of amplifier stages, as at $S_1$, $S_2$ and $S_3$. The switches $S_1$ and $S_2$—$S_3$ are shown cooperating with respective contact members 1, 2, 3, 4 and 1′, 2′, 3′, 4′—1″, 2″, 3″, 4″, between respective amplifier stages A and B and the corresponding second sets of amplifier stages of the two channels. The switches are all illustrated as synchronously operated by means of a dotted gang connection.

With the switches in the position shown, the audio-signal outputs of the first set of amplifier stages A and B of both channels are combined and fed together to the second set of amplifier stages of the upper channel only, thus evidencing a mixed signal in the loudspeaker $L_1$ that contains all the frequency components of the signals applied to both channels. When switch $S_1$ is moved to position 2, and switches $S_2$ and $S_3$ to respective positions 2′ and 2″, the outputs of both channel amplifier stages A and B are combined and produce a mixed sound output at loudspeaker $L_2$.

By balancing the over-all sound-level effect apparent to the listener as the switch $S_1$ (and the ganged switches $S_2$ and $S_3$) is moved back and forth between positions 1 and 2, dynamic equalization can be achieved of the actual signal sounds of both channels as emitted by the loudspeakers $L_1$ and $L_2$. Frequency-response equalization for both treble and bass regions can be effected by adjustment of the variable potentiometers $R_1$, $R_1'$ and $R_2$, $R_2'$ of the RC filter networks disposed between the first and second amplifier stages of the second set of amplifier stages of each channel. Adjustment of further potentiometers $A_1$ and $A_2$, schematically illustrated by a dotted gang connection to represent simultaneous movement of the sliders, but in opposite directions along the respective potentiometers, and preferably isolated from the controls $R_1$, $R_1'$ and $R_2$, $R_2'$ by the presence of the second stage of the second set of amplifiers of the respective channels, will serve to permit opposite-sense attenuation of the signals and hence relative signal-level control. A common control $A_3$, connected between the potentiometer controls $A_1$ and $A_2$, and labelled "Level Balance," however, will permit the desirable effect of increase in level of one channel signal while simultaneously decreasing the level of the other, or vice versa.

The illustrated location of the switching mechanism $S_1$, $S_2$, $S_3$ between the first and the second sets of amplifier stages is preferred since disposing the switches at a point of too low a signal level results in the pick-up of hum, whereas disposition at a point of too high a signal level results in undesirable clicks and transient phenomena.

After this balancing operation, the switches $S_1$, $S_2$ and $S_3$ may be moved to respective positions 4, 4′ and 4″, in order to cause signal A to feed through channel A to loudspeaker $L_1$ only, and signal B to feed through channel B to loudspeaker $L_2$ only, thus to provide balanced stereophonic reproduction. Combined monophonic reproduction may also be obtained in switch positions 3, 3′, 3″.

Further modifications will occur to those skilled in the art and all such are considered to fall within the spirit and scope of the invention as defined in the appended claims.

What is claimed is:

1. Electrical apparatus having, in combination, a pair of signal transmission channels each provided with first and second sets of amplifier stages and signal-level indicating means connected thereto, means for applying a pair of signals to the first set of amplifier stages of the pair of channels, multiple-position switching means interposed in each channel between the first and second sets of amplifier stages thereof, the switching means in a first of the multiple positions connecting the first set of amplifier stages of the channels together and to the second set of amplifier stages of one of the channels, the switching means in a second position connecting the first set of amplifier stages of the channels together and to the second set of amplifier stages of the other channel, means operative as the switching means is switched back and forth between the said first and second positions for adjusting both the level and over-all frequency response of the second set of amplifier stages of each channel in order to balance the same in accordance with the indications of the signal-level indicating means and the switching means having a further position for thereupon connecting the first set of amplifier stages of each channel to the second set of amplifier stages thereof in order to transmit the signals in the first set of amplifier stages of each channel only to the corresponding second set of amplifier stages of that channel.

2. Electrical apparatus as claimed in claim 1 and in which the adjusting means comprises attenuating and frequency-response controls disposed in the second set of amplifier stages, isolated from one another by at least one stage thereof.

3. Electrical apparatus as claimed in claim 2 and in which the attenuating means of both channels are simultaneously controlled so that an increase in one causes a decrease in the other and vice versa.

4. Apparatus in accordance with claim 1, in which said signal-level indicating means comprises a pair of loud-speakers associated with said channels, respectively, and wherein said signal applying means comprises means for applying a pair of stereophonic audio signals to said first set of amplifier stages of the pair of channels, respectively.

References Cited in the file of this patent

UNITED STATES PATENTS

| | | |
|---|---|---|
| 2,481,911 | De Boer et al. | Sept. 13, 1949 |
| 2,505,585 | Silent | Apr. 25, 1950 |
| 2,920,139 | Hargrave | Jan. 5, 1960 |

OTHER REFERENCES

Becker: "Improving Responses of Home-Assembled Coaxial Speakers," Radio and Television News, June 1920.

Burstein et al.: "Stereo Balance and Gain Control," Radio and TV News; pp. 42, 43, 106.

Burstein: "Amplifiers for Stereo"; Radio Electronics, pp. 40–45, October 1958.

Scott: "Stereo Control Circuits"; Radio Electronics, pp. 36–39, March 1959.

Burstein: "Stereo Amplifier Controls—and What They Do"; Electronics World; pp. 55–57, 122, August 1959.